(12) United States Patent
Morikawa et al.

(10) Patent No.: US 12,493,324 B2
(45) Date of Patent: Dec. 9, 2025

(54) ELECTRONIC DEVICE WITH LEVER ATTACHABLE ELECTRONIC COMPONENT

(71) Applicant: Panasonic Intellectual Property Management Co., Ltd., Osaka (JP)

(72) Inventors: Ryota Morikawa, Osaka (JP); Takeshi Mori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 173 days.

(21) Appl. No.: 18/228,189

(22) Filed: Jul. 31, 2023

(65) Prior Publication Data

US 2023/0376079 A1 Nov. 23, 2023

Related U.S. Application Data

(63) Continuation of application No. PCT/JP2021/041996, filed on Nov. 16, 2021.

(30) Foreign Application Priority Data

Feb. 26, 2021 (JP) ................. 2021-029433

(51) Int. Cl.
*G06F 1/16* (2006.01)
(52) U.S. Cl.
CPC .......... *G06F 1/1654* (2013.01); *G06F 1/1616* (2013.01); *G06F 1/1681* (2013.01)
(58) Field of Classification Search
CPC .... G06F 1/1658; G06F 1/1632; G06F 1/1654; G06F 1/183; H05K 5/0221; H05K 5/0217; H05K 7/1409
See application file for complete search history.

(56) References Cited

U.S. PATENT DOCUMENTS

| | | | |
|---|---|---|---|
| 5,320,544 A | * | 6/1994 | Naoto .............. H01R 13/62938 439/157 |
| 5,727,959 A | | 3/1998 | Yagi et al. |

(Continued)

FOREIGN PATENT DOCUMENTS

| | | |
|---|---|---|
| JP | H05-290921 A | 11/1993 |
| JP | H08-153552 A | 6/1996 |

(Continued)

OTHER PUBLICATIONS

International Search Report for related Application No. PCT/JP2021/041996, mailed Feb. 15, 2022.

*Primary Examiner* — Allen L Parker
*Assistant Examiner* — Dakota M Talbert
(74) *Attorney, Agent, or Firm* — Renner, Otto, Boisselle & Sklar, LLP

(57) ABSTRACT

An electronic device includes a housing including an attachment surface, an electronic component detachably attached to the attachment surface, and a lever attached to the housing in a state of being rotatable about a rotation axis adjacent to the electronic component and extending along the attachment surface. The lever has a lever body facing the electronic component in a direction where the rotation axis extends and extending along a radial direction orthogonal to the rotation axis. The lever body includes a recess recessed in a direction approaching the rotation axis of the lever along the radial direction. The electronic component includes a protrusion facing the recess, protruding in a direction toward the lever body, and being housed in the recess. By rotating the lever in a direction away from the attachment surface, the protrusion moves in a direction away from the rotation axis in the recess.

11 Claims, 7 Drawing Sheets

(56) References Cited

U.S. PATENT DOCUMENTS

| | | | |
|---|---|---|---|
| 9,727,086 B2* | 8/2017 | Kim | H04M 1/0262 |
| 9,756,157 B2* | 9/2017 | Iwamoto | H04M 1/0262 |
| 2008/0100262 A1 | 5/2008 | Ozaki et al. | |
| 2012/0268872 A1* | 10/2012 | Shimazaki | G06F 1/1658 |
| | | | 361/679.01 |

FOREIGN PATENT DOCUMENTS

| | | |
|---|---|---|
| JP | H09-326248 A | 12/1997 |
| JP | H11-016243 A | 1/1999 |
| JP | 11-162431 A | 6/1999 |
| JP | 2001-043841 A | 2/2001 |
| JP | 2008-109494 A | 5/2008 |
| JP | 2009-032595 A | 2/2009 |

* cited by examiner

ELECTRONIC DEVICE WITH LEVER ATTACHABLE ELECTRONIC COMPONENT

TECHNICAL FIELD

The present disclosure relates to an electronic device.

BACKGROUND ART

PTL 1 discloses a lever-fitting type connector including one connector having a lever provided with a cam groove and the other connector having a protrusion housed in the cam groove. In this connector, by rotating the lever in a state where the protrusion is housed in one end of the cam groove, the other connector is attracted to one connector, and both connectors are joined.

CITATION LIST

Patent Literature

PTL 1: Unexamined Japanese Patent Publication No. H8-153552

SUMMARY OF THE INVENTION

An object of the present disclosure is to provide an electronic device in which an electronic component can be easily detached.

An electronic device according to one aspect of the present disclosure includes: a housing including an attachment surface; an electronic component detachably attached to the attachment surface; and a lever that is provided adjacent to the electronic component and is attached to the housing in a state of being rotatable about a rotation axis extending along the attachment surface, the lever being configured to detach the electronic component attached to the attachment surface by being rotated. The lever includes a lever body that faces the electronic component in a first direction along which the rotation axis extends, the lever body extending from the rotation axis along a second direction that is a radial direction orthogonal to the rotation axis and along the attachment surface, the lever body includes an end closer to the electronic component than to the rotation axis in the radial direction, and a recess that is open at the end and is recessed in a direction approaching the rotation axis along the radial direction, the electronic component includes a surface facing the lever body in the first direction, and a protrusion that faces the recess in the first direction, protrudes in a direction toward the lever body from the surface facing the lever body, and is housed in the recess, and by rotating the lever in a direction away from the attachment surface, the protrusion in the recess moves in a direction away from the rotation axis.

According to the present disclosure, it is possible to realize an electronic device in which an electronic component can be easily detached.

DESCRIPTION OF EMBODIMENT

Background to Present Disclosure

Figure 1:
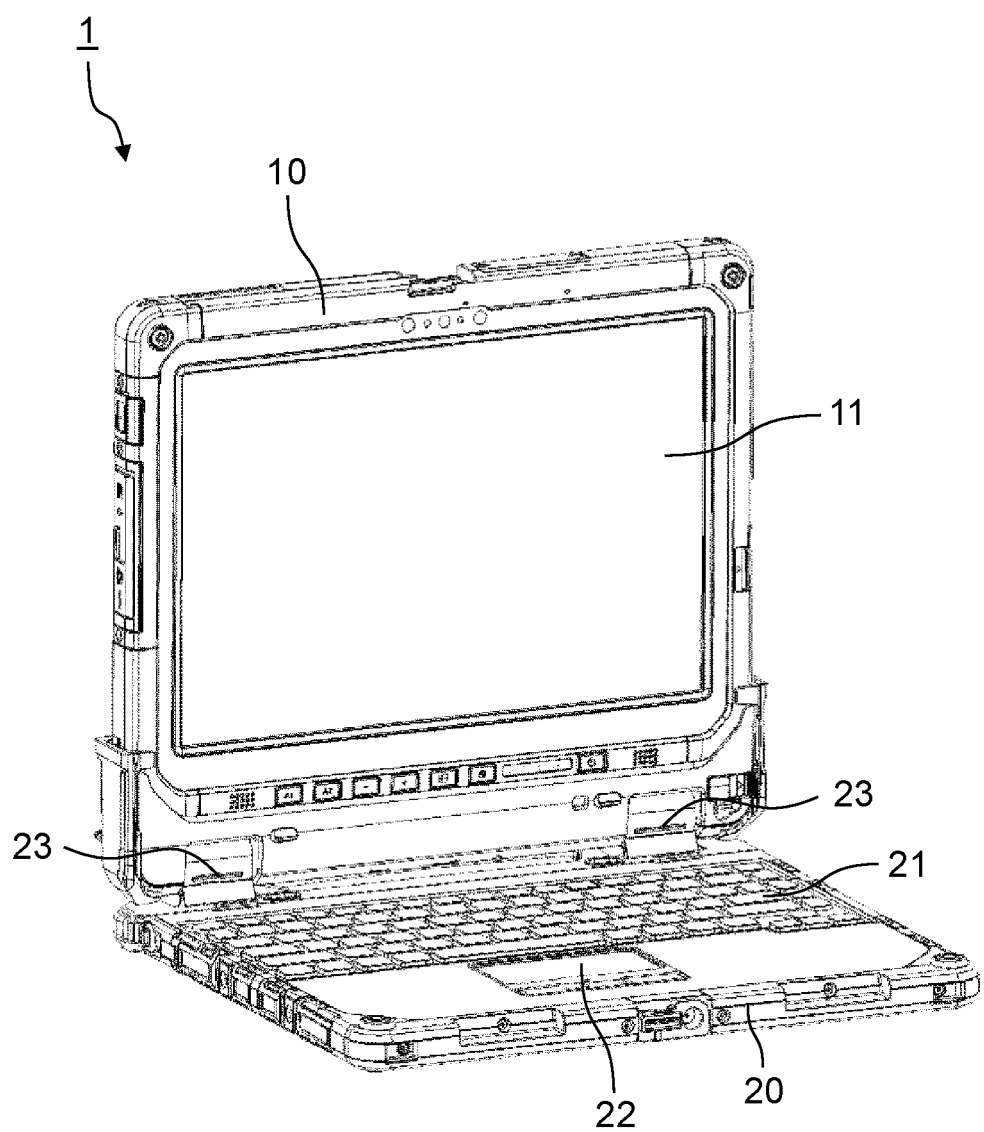
FIG. 1 is a schematic perspective view illustrating an electronic device according to an exemplary embodiment of the present disclosure.

In the connector of PTL 1, a moving distance of the connector according to the rotation of the lever is short, and it is difficult to greatly separate the other connector from the one connector by the rotation of the lever. For this reason, when the connector attachment and detachment structure of PTL 1 is applied to an electronic device and an electronic component is detached from the electronic device, the electronic component is not easily detached from the electronic device in some cases.

The present inventors have devised an electronic device in which an electronic component can be easily detached, and have reached the present disclosure.

An electronic device according to a first aspect of the present disclosure includes: a housing having an attachment surface; an electronic component detachably attached to the attachment surface; and a lever that is provided adjacent to the electronic component, is attached to the housing in a state of being rotatable about a rotation axis extending along the attachment surface, and is capable of detaching the electronic component in the attached state by being rotated, wherein the lever includes a lever body that faces the electronic component in a first direction in which the rotation axis extends and extends from the rotation axis in a radial direction with respect to the rotation axis and along a second direction along the attachment surface, the lever body has a recess that is open at an end closer to the electronic component than to the rotation axis in the radial direction and extends in a direction approaching the rotation axis along the radial direction, the electronic component has a protrusion that faces the recess in the first direction, protrudes from a surface facing the lever body in the first direction in a direction toward the lever body in the first direction, and is housed in the recess, and by rotating the lever in a direction in which the lever body moves away from the attachment surface, the protrusion moves in the recess in a direction away from the rotation axis.

With the electronic device of the first aspect, it is possible to realize an electronic device in which an electronic component can be easily detached.

In an electronic device according to a second aspect of the present disclosure, the electronic component has a first end portion close to the lever in a second direction along the attachment surface in the radial direction, and a second end portion far from the lever in the second direction, the protrusion is disposed at the first end portion, and the second end portion is provided with a protruding portion that protrudes in the second direction and in a direction away from the lever, the housing has a wall provided with a housing recess depressed in the second direction and in a direction away from the lever, and the protruding portion is housed in the housing recess.

With the electronic device of the second aspect, the movement of the electronic component in the second direction and in the direction away from the lever is restricted. Furthermore, the movement of the second end portion in the direction intersecting the attachment surface is restricted. Therefore, the electronic component can be rotated about the second end portion by rotating the lever in a direction away from the attachment surface. As a result, first end portion of electronic component can be easily raised.

In an electronic device according to a third aspect of the present disclosure, the protrusion has a curved surface facing the recess in a rotation direction of the lever.

With the electronic device of the third aspect, the protrusion can be smoothly moved along the recess.

In an electronic device according to a fourth aspect of the present disclosure, the recess has a first inner surface and a second inner surface facing each other in a rotation direction of the lever, the first inner surface is disposed farther from the attachment surface in the rotation direction than the second inner surface is, and in a state where the electronic component is attached to the attachment surface, the first inner surface is in contact with the protrusion, and while the lever rotates in a direction away from the attachment surface, the protrusion moves in a direction away from the attachment surface while being in contact with the second inner surface.

With the electronic device of the fourth aspect, in a state where the electronic component is attached to the attachment surface, the protrusion can be pressed toward the attachment surface by the first inner surface, so that the electronic component can be more reliably attached to the electronic device. When the electronic component is detached from the electronic device, the protrusion can be guided along the second inner surface in the radial direction and in the direction away from the rotation axis.

In an electronic device according to fifth aspect of the present disclosure, the lever body includes an inclined portion that is disposed closer to the attachment surface than the recess is in the radial direction, and the inclined portion has an inclined surface that is continuous with the second inner surface and is inclined in a direction intersecting the second inner surface and in a direction approaching the attachment surface with increasing distance from the rotation axis.

With the electronic device of the fifth aspect, the first end portion of the electronic component can be raised to a greater extent from the attachment surface.

In an electronic device according to a sixth aspect of the present disclosure, the lever body includes a cam portion disposed on an opposite side of the recess with respect to the rotation axis in the radial direction, and the cam portion is configured to be in contact with the attachment surface in a state where the electronic component is attached to the attachment surface.

With the electronic device of the sixth aspect, the electronic component can be more reliably attached to the attachment surface.

An electronic device according to a seventh aspect of the present disclosure in which the recess has a third inner surface connected to an end of the first inner surface, the end being distant from the electronic component in the first direction, and an end of the second inner surface, the end being distant from the electronic component in the first direction, and the protrusion may be disposed between the third inner surface and the electronic component in the first direction.

With the electronic device of the seventh aspect, the mechanical strength of the lever can be improved.

Hereinafter, exemplary embodiments of the present disclosure will be described with reference to the accompanying drawings. In each of the drawings, elements are exaggerated in order to facilitate explanation.

EXEMPLARY EMBODIMENT

As illustrated in FIG. 1, electronic device 1 is, for example, a notebook personal computer (laptop PC). Electronic device 1 includes first unit 10 and second unit 20. First unit 10 is detachably attached to second unit 20. As a result, electronic device 1 is configured as a so-called detachable computer.

First unit 10 is, for example, a tablet computer. First unit 10 has a substantially rectangular plate shape, and has display 11 on one surface intersecting the thickness direction. Display 11 is, for example, a liquid crystal display panel. Furthermore, display 11 is a touch panel capable of receiving touch operation by a user. First unit 10 incorporates a central processing unit (CPU), a volatile storage device (RAM), a nonvolatile storage device (ROM, SSD, or the like), a battery, and the like. The nonvolatile storage device (ROM, SSD, or the like) stores an operating system (OS), various application programs, various data, and the like. The central processing unit (CPU) executes arithmetic processing by reading the OS, the application programs, and the various data, thereby realizing various functions.

As an example, second unit 20 is a station to which first unit 10 is detachably attached. Second unit 20 has a substantially rectangular plate shape, and includes input units 21, 22 on one surface intersecting the thickness direction, the input units being capable of performing input processing by the user. Input units 21, 22 include, for example, keyboard 21 and touch pad 22.

First unit 10 is attached to second unit 20 via hinges 23. Hinges 23 are each disposed at an edge of second unit 20 in the depth direction. Hinges 23 each have rotation axis L parallel to the width direction of electronic device 1. Hinges 23 rotate first unit 10 about rotation axis L with respect to second unit 20. Hinges 23 may retain first unit 10 at various angles relative to second unit 20, for example. For example, as illustrated in FIG. 1, hinges 23 can hold first unit 10 at an angle of 90 degrees with respect to second unit 20. In this case, first unit 10 is in an opened state opened at an angle of 90 degrees with respect to second unit 20. Hinges 23 can also retain first unit 10 in a closed state forming an angle of 0 degrees with respect to second unit 20.

Next, a configuration of first unit 10 will be described. In FIGS. 2 to 10, some of the components constituting first unit 10 are omitted.

Figure 2:
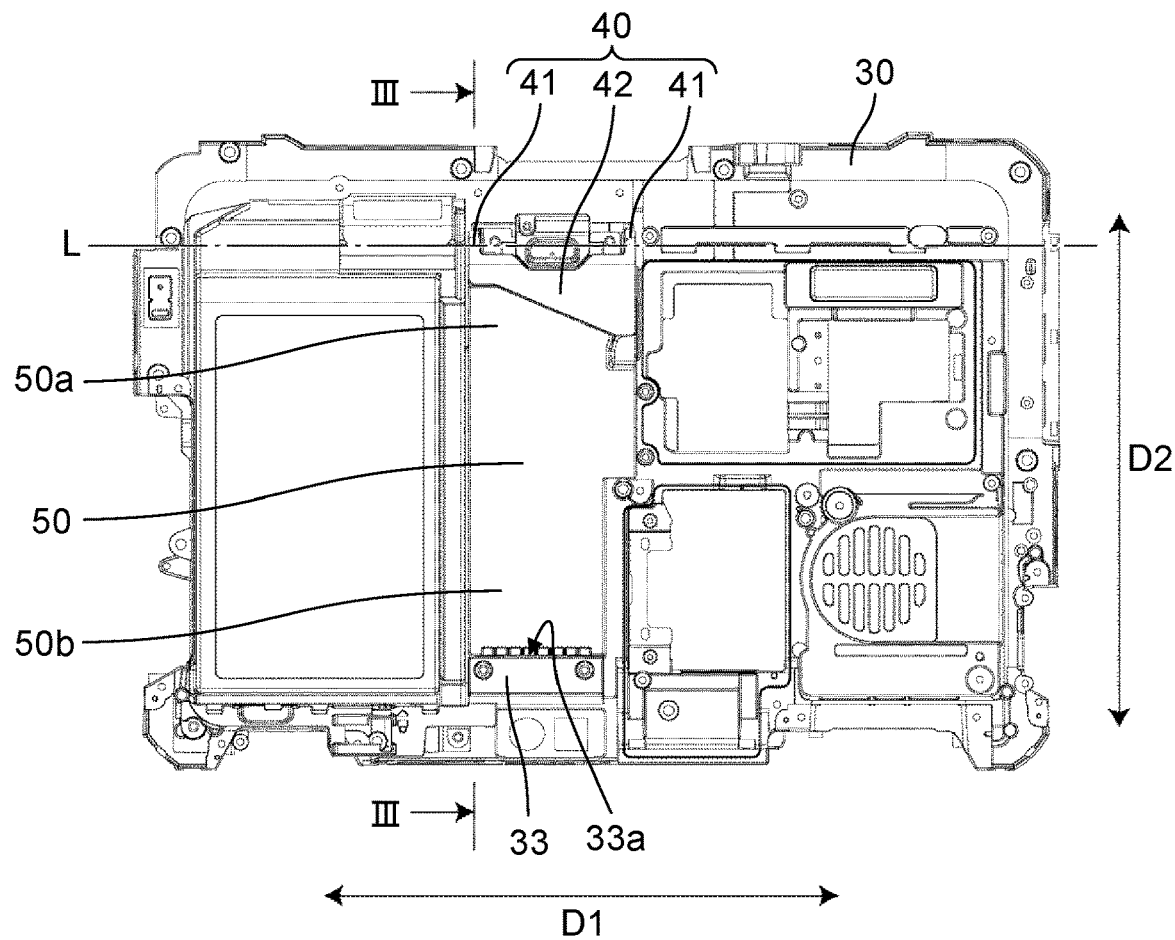
FIG. 2 is a plan view of a first unit in the electronic device of FIG. 1 as viewed from a fourth main surface side.

As illustrated in FIG. 2, first unit 10 includes housing 30, electronic component 50, and lever 40.

Figure 3:
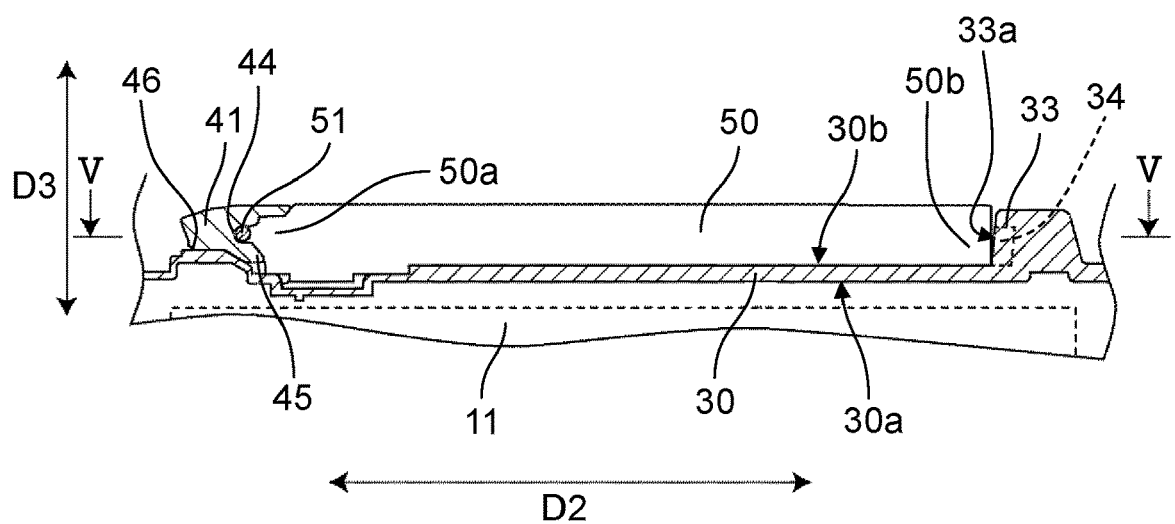
FIG. 3 is a partial cross-sectional view taken along line of FIG. 2.

As illustrated in FIG. 3, housing 30 has, for example, a substantially rectangular plate shape, and has first surface 30*a* and second surface 30*b* each intersecting the thickness direction. Display 11 is provided on first surface 30*a*. Second surface 30*b* is an example of an attachment surface in the present disclosure.

As illustrated in FIG. 3, lever 40 and electronic component 50 are attached to second surface 30*b* of housing 30. As illustrated in FIG. 2, lever 40 is disposed adjacent to electronic component 50 in the lateral direction of housing 30. Lever 40 has rotation axis L along second surface 30b, and is attached to housing 30 in a state of being rotatable about rotation axis L. By rotating lever 40, electronic component 50 attached to housing 30 is detached from housing 30. That is, lever 40 rotates between first position P1 (see FIG. 4) at which lever bodies 41 extend in second direction D2 and second position P2 (see FIG. 10) at which lever bodies 41 extend in a direction intersecting second surface 30b. In the present exemplary embodiment, rotation axis L of lever 40 extends in the longitudinal direction of housing 30.

Hereinafter, a direction (for example, in the longitudinal direction of housing 30) in which rotation axis L of lever 40 extends is referred to as first direction D1, and a direction that is a radial direction with respect to rotation axis L of lever 40 (hereinafter, simply referred to as a radial direction) and is along the second surface 30b (for example, in the lateral direction of housing 30) is referred to as second direction D2. Here, the radial direction with respect to rotation axis L means a direction orthogonal to rotation axis L. A direction intersecting second surface 30b (for example, in the thickness direction of housing 30) is referred to as third direction D3.

Figure 5:
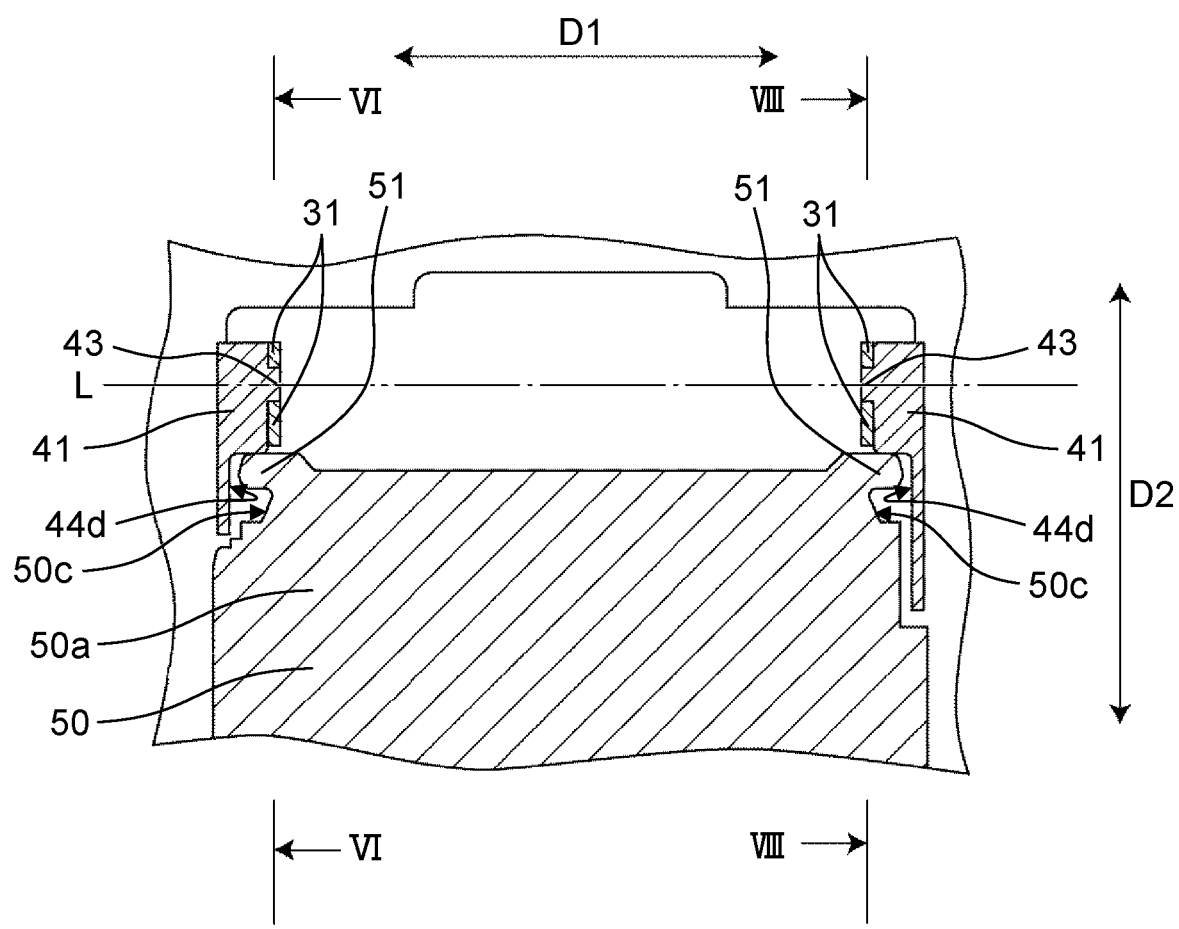
FIG. 5 is a partial cross-sectional view taken along line V-V of FIG. 3.

As illustrated in FIG. 5, housing 30 includes two bearings 31 that are provided on second surface 30b and rotatably support lever 40. Each of bearings 31 is adjacent to both ends of electronic component 50 in first direction D1 and outside in second direction D2 with respect to first end portion 50a of electronic component 50. In the present exemplary embodiment, lever bodies 41 to be described later are located outside each of bearings 31 in first direction D1. Each of bearings 31 has a plate shape, and plate surfaces thereof face each other. Each of bearings 31 has a substantially circular shape and has bearing hole 32 penetrating bearing 31 in first direction D1.

Figure 7:
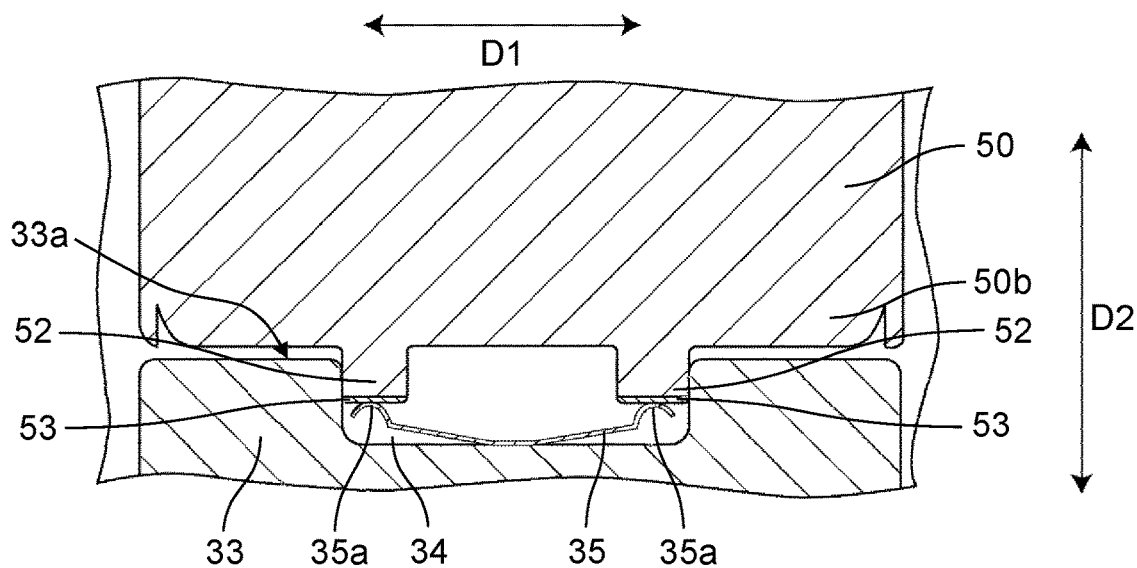
FIG. 7 is a partial cross-sectional view taken along line V-V of FIG. 3.

As illustrated in FIGS. 3 and 7, housing 30 has wall 33 adjacent to second end portion 50b of electronic component 50 described later in second direction D2. Wall 33 has a wall surface 33a extending in third direction D3 from second surface 30b and facing second end portion 50b in second direction D2. As illustrated in FIG. 7, housing recess 34 depressed from wall surface 33a along second direction D2 is formed in wall 33.

As illustrated in FIG. 7, housing 30 includes first elastic terminal 35 provided inside housing recess 34. First elastic terminal 35 is formed of a conductive material and is grounded. First elastic terminal 35 has first connection portions 35a that bias electronic component 50 attached to second surface 30b toward first end portion 50a in second direction D2. When electronic component 50 is attached to second surface 30b, first connection portions 35a come into contact with first connecting terminals 53 of electronic component 50 described later and are electrically connected to an electronic circuit (not illustrated) of electronic component 50.

In the present exemplary embodiment, first elastic terminal 35 is formed of a substantially V-shaped leaf spring when viewed along third direction D3. In first elastic terminal 35, a central portion in first direction D1 is attached to a surface facing second end portion 50b of housing recess 34 in second direction D2, and both ends in first direction D1 are disposed closer to electronic component 50 than the central portion is in first direction D1. First elastic terminal 35 has two first connection portions 35a provided at both ends in first direction D1. Each of first connection portions 35a has an arc shape curved toward each of first connecting terminals 53 when viewed along third direction D3.

Figure 8:
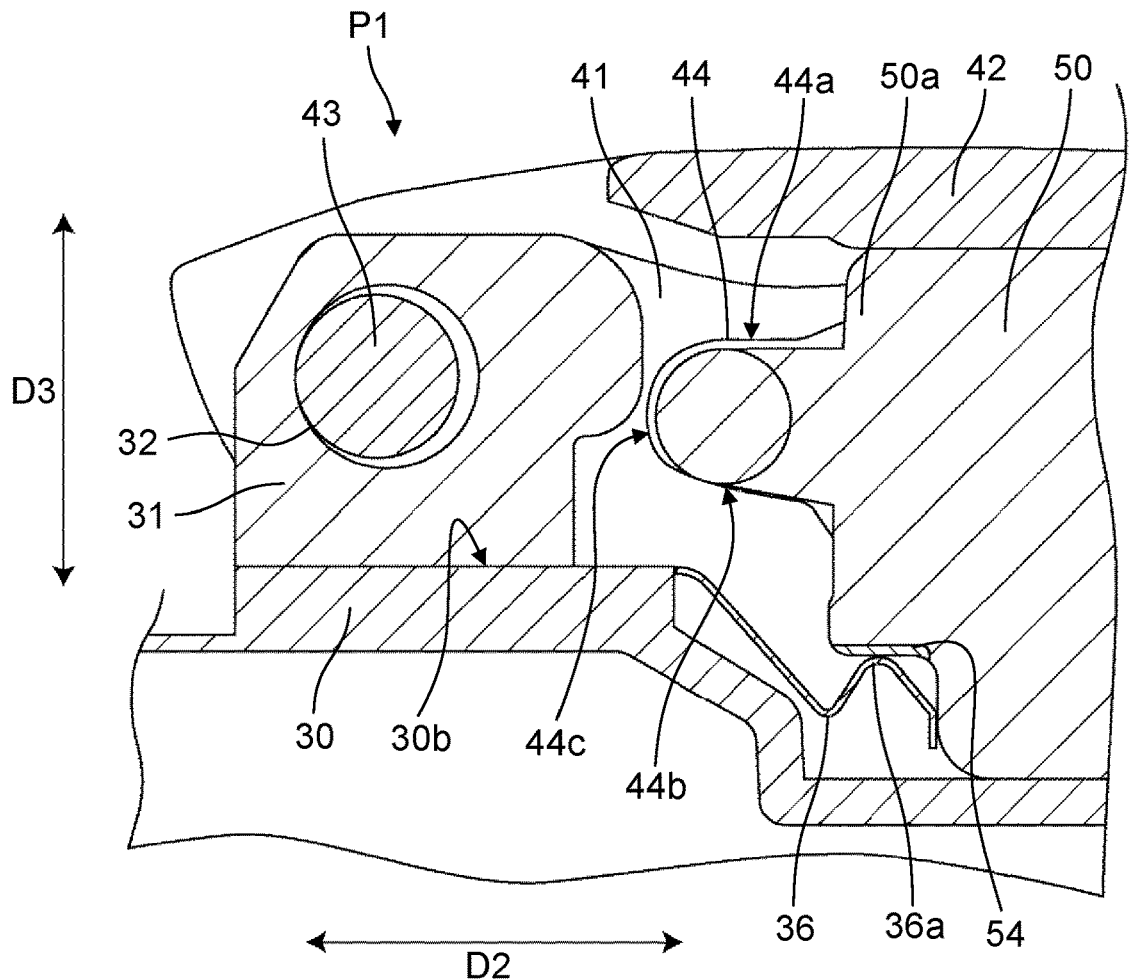
FIG. 8 is a partial cross-sectional view taken along line VIII-VIII in FIG. 5.
Figure 9:
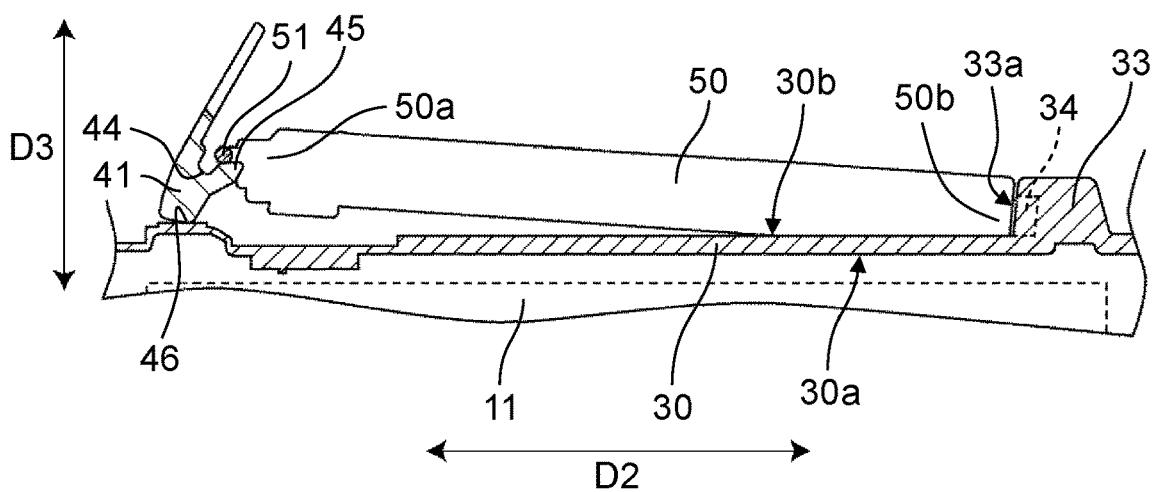
FIG. 9 is a cross-sectional view of the electronic device of FIG. 1.

As illustrated in FIG. 8, housing 30 has second elastic terminal 36 disposed adjacent to first end portion 50a of electronic component 50 described later. Second elastic terminal 36 is formed of a conductive material and is grounded. Second elastic terminal 36 has second connection portion 36a that biases electronic component 50 attached to second surface 30b in a direction away from second surface 30b in third direction D3. When electronic component 50 is attached to second surface 30b, second connection portion 36a comes into contact with second connecting terminal 54 of electronic component 50 described later and is electrically connected to the electronic circuit of electronic component 50.

In the present exemplary embodiment, second elastic terminal 36 is formed of a substantially S-shaped leaf spring extending in second direction D2. One end portion of second elastic terminal 36 in second direction D2 is attached to housing 30. Second connection portion 36a is disposed at the other end portion of second elastic terminal 36 in second direction D2.

The grounding of electronic component 50 is usually performed at one place. In this case, when an external force such as vibration is applied and electronic component 50 moves, the contact is detached and a situation in which grounding cannot be temporarily performed occurs, and the electronic component 50 becomes weak against external noise in some cases. In electronic device 1, first elastic terminal 35 and second elastic terminal 36 are brought into contact with electronic component 50 at multiple points and in different directions to perform grounding. This prevents the occurrence of a situation in which grounding cannot be performed even when an external force is applied, making electronic device 1 more resistant to external noise. In addition, since first elastic terminal 35 and second elastic terminal 36 are formed of leaf springs, electronic component 50 can be easily attached to and detached from housing 30.

As illustrated in FIGS. 2 and 3, electronic component 50 has, as an example, a substantially rectangular parallelepiped shape, and has first end portion 50a close to lever 40 in second direction D2 and second end portion 50b far from lever 40 in second direction D2. Electronic component 50 is, for example, a smart card reader, a battery, or a solid state drive (SSD), and is detachably attached to second surface 30b of housing 30.

Figure 4:
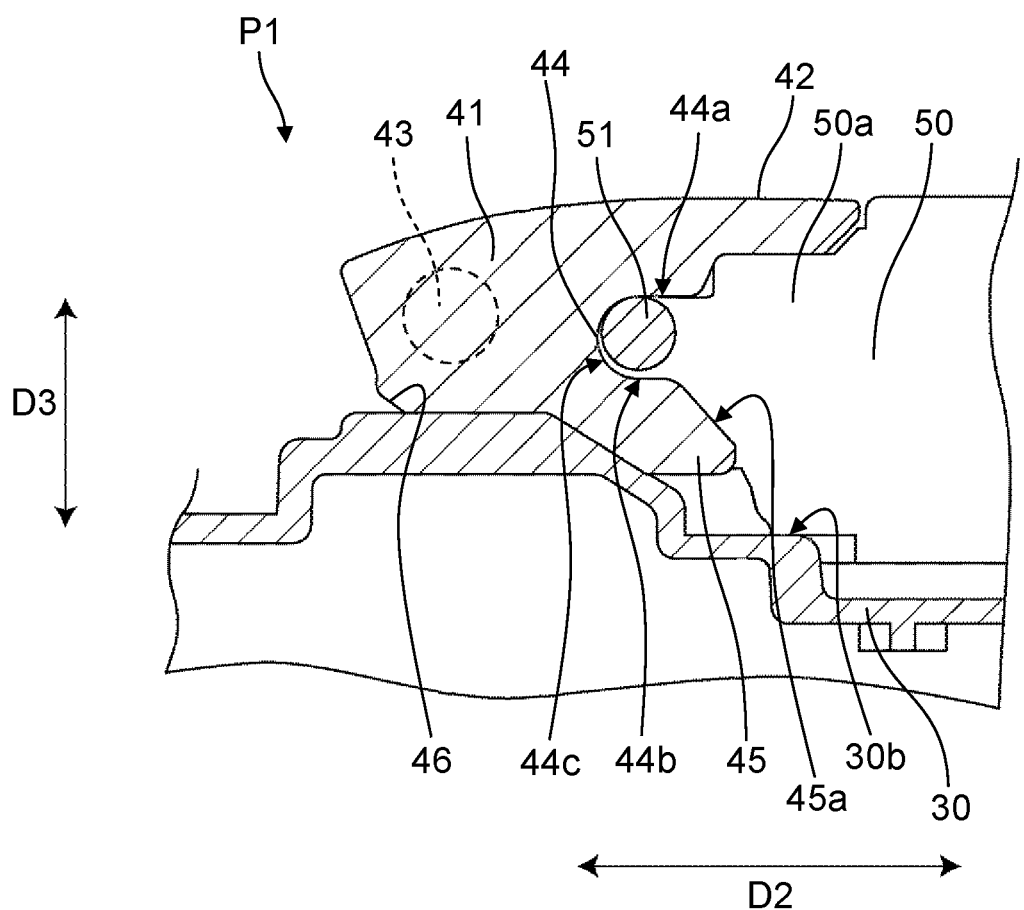
FIG. 4 is an enlarged cross-sectional view of FIG. 3.

As illustrated in FIG. 5, electronic component 50 has protrusions 51 provided at first end portion 50a. Protrusions 51 protrude along first direction D1 from surface 50c facing lever bodies 41 described later in first direction D1 of electronic component 50. In the present exemplary embodiment, electronic component 50 has two protrusions 51 protruding toward opposite sides in first direction D1. As illustrated in FIG. 4, each of protrusions 51 has a substantially circular shape when viewed along first direction D1, and has a curved surface facing recess 44 of lever 40 to be described later in the rotation direction of lever 40 (in other words, in the circumferential direction with respect to rotation axis L).

As illustrated in FIG. 7, electronic component 50 has protruding portions 52 provided at second end portion 50b. Protruding portions 52 protrude in a direction away from lever 40 in second direction D2. In the present exemplary embodiment, electronic component 50 has two protruding portions 52. each of protruding portions 52 has first connecting terminal 53 provided at a distal end in second direction D2. each of first connecting terminals 53 is formed of a conductive member, and is electrically connected to the electronic circuit of electronic component 50.

When electronic component 50 is attached to second surface 30b, each of protruding portions 52 is housed in housing recess 34. each of protruding portions 52 restricts movement of second end portion 50b of electronic component 50 in second direction D2 and in the direction away from lever 40 and movement in third direction D3.

As illustrated in FIG. 8, electronic component 50 has second connecting terminal 54 provided at first end portion 50a. Second connecting terminal 54 faces second surface 30b in third direction D3. Second connecting terminal 54 is formed of a conductive member, and is electrically connected to the electronic circuit of electronic component 50.

As illustrated in FIGS. 4 and 5, lever 40 has lever bodies 41 extending in second direction D2 when located at first position P1. As illustrated in FIG. 5, lever bodies 41 face electronic component 50 in first direction D1. In the present exemplary embodiment, lever 40 includes two lever bodies 41 having mutually different lengths in second direction D2, and connection part 42. Each of lever bodies 41 is disposed on both sides of electronic component 50 in first direction D1. That is, the two lever bodies 41 include a first lever body and a second lever body. Electronic component 50 is located between the first lever body and the second lever body in first direction D1.

As illustrated in FIG. 5, each of lever bodies 41 has rotation shaft portion 43 housed in bearing hole 32 of bearing 31. Each of rotation shaft portions 43 has a substantially circular shape when viewed along first direction D1, and protrudes from each of lever bodies 41 in first direction D1 and in a direction approaching electronic component 50. An imaginary straight line connecting the centers of rotation shaft portions 43 of lever bodies 41 when viewed along first direction D1 constitutes rotation axis L of lever 40.

As illustrated in FIG. 4, each of lever bodies 41 has recess 44 capable of housing each of protrusions 51 of electronic component 50. Recess 44 is open at an end closer to electronic component 50 than to rotation axis L in the radial direction, and is recessed in a direction approaching rotation axis L along the radial direction. Recess 44 has first inner surface 44a and second inner surface 44b facing each other in the rotation direction of lever 40, and curved bottom surface 44c connecting first inner surface 44a and second inner surface 44b. First inner surface 44a is an inner surface closer to second surface 30b in the rotation direction of lever 40. Second inner surface 44b is an inner surface farther from second surface 30b in the rotation direction of lever 40. For example, as illustrated in FIG. 4, when lever 40 is located at first position P1, recess 44 extends along second direction D2, and received protrusion 51 is in contact with first inner surface 44a of recess 44.

Figure 6:
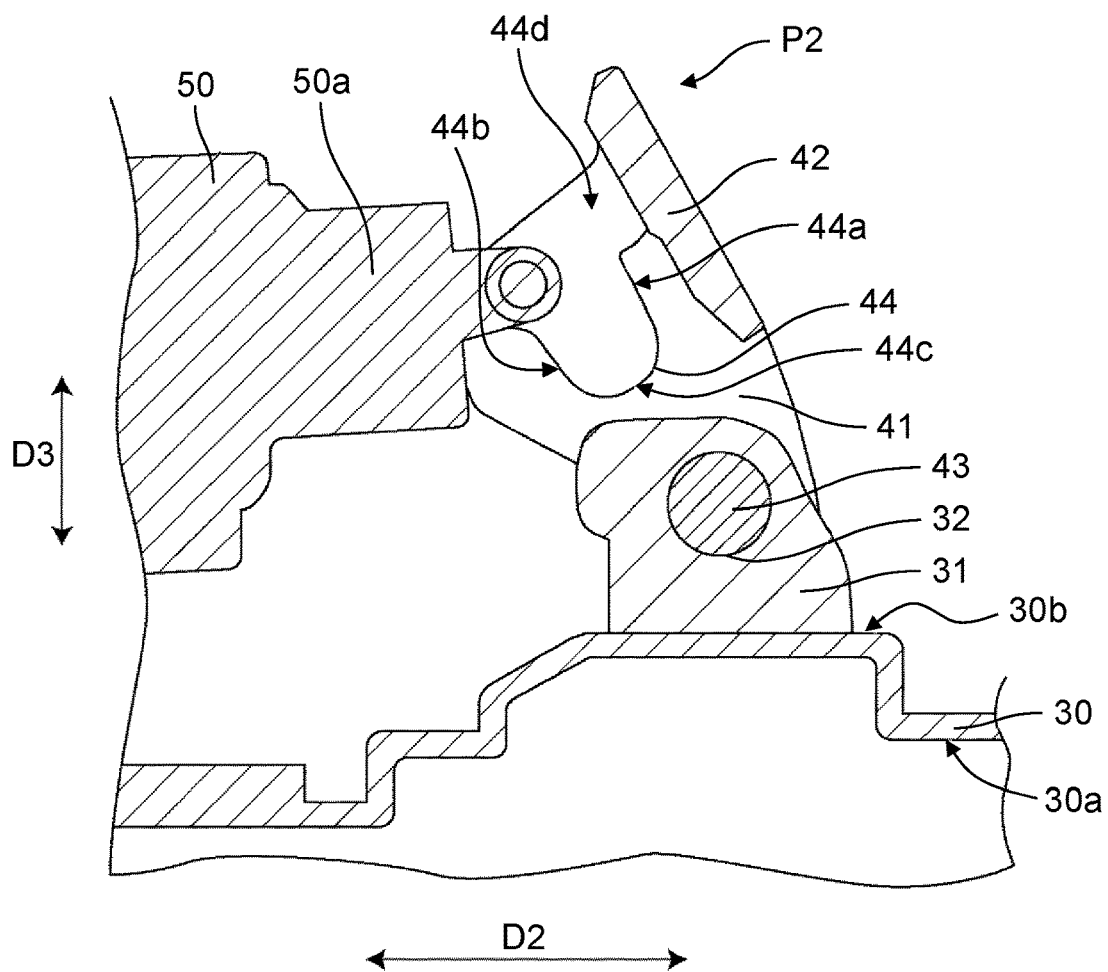
FIG. 6 is a partial cross-sectional view taken along line VI-VI of FIG. 5.

As illustrated in FIG. 6, recess 44 has third inner surface 44d that connects an end of first inner surface 44a far from electronic component 50 in first direction D1 and an end of second inner surface 44b far from electronic component 50 in first direction D1. The movement of each of protrusions 51 of electronic component 50 in first direction D1 is restricted by third inner surface 44d. That is, each of protrusions 51 of electronic component 50 is supported by first inner surface 44a, second inner surface 44b, and third inner surface 44d.

Each of lever bodies 41 has inclined portion 45 and cam portion 46.

As illustrated in FIG. 4, inclined portion 45 is disposed closer to second surface 30b than recess 44 is in the rotation direction of lever 40. Inclined portion 45 has inclined surface 45a continuous with second inner surface 44b. When lever 40 is at first position P1, inclined surface 45a is inclined in a direction intersecting with second inner surface 44b and in a direction approaching second surface 30b in third direction D3 with increasing distance from rotation axis L. In the present exemplary embodiment, a portion where second inner surface 44b and inclined surface 45a are connected is rounded.

As illustrated in FIG. 4, cam portion 46 is formed on the side opposite to recess 44 with respect to rotation axis L in the radial direction. For example, when lever 40 is located at first position P1, cam portion 46 is disposed at an end opposite to recess 44 in second direction D2 so as to face second surface 30b. Cam portion 46 protrudes in a direction away from rotation axis L in the radial direction. In the present exemplary embodiment, cam portion 46 has a substantially trapezoidal shape in which the short side is disposed farther from rotation axis L in the radial direction than the long side is. When lever 40 is located at first position P1, one oblique side of cam portion 46 is in contact with second surface 30b. That is, the force required for the rotation of lever 40 varies according to the position of cam portion 46. As a result, a click feeling is given to the operator when lever 40 is rotated.

As illustrated in FIG. 2, connection part 42 is connected to an end of each of lever bodies 41 far from second surface 30b in third direction D3, and rotates in conjunction with each of lever bodies 41. When lever 40 is located at first position P1, connection part 42 is disposed so as to sandwich first end portion 50a of electronic component 50 together with second surface 30b as illustrated in FIG. 4. In the present exemplary embodiment, as illustrated in FIG. 2, connection part 42 has a substantially right triangle shape in which an end portion far from rotation axis L in the radial direction is an oblique side. When lever 40 at first position P1 is rotated toward second position P2, an end close to second end portion 50b in second direction D2 of connection part 42 is grasped and operated. At this time, lever 40 can be rotated with a small force by operating the end on lever body 41 side having a larger length in second direction D2.

Next, an operation when electronic component 50 is detached from second surface 30b will be described.

As illustrated in FIG. 4, when electronic component 50 is attached to second surface 30b, lever 40 is located at first position P1. At this time, each of protrusions 51 is housed near bottom surface 44c of recess 44 and is in contact with first inner surface 44a. Lever 40 presses each of protrusions 51 toward second surface 30b by cam portion 46.

When detaching electronic component 50 from second surface 30b, lever 40 at first position P1 is rotated toward second position P2. As lever 40 is rotated, each of protrusions 51 leaves first inner surface 44a to come into contact with second inner surface 44b, and moves along second inner surface 44b in the radial direction and in the direction away from rotation axis L. At this time, each of protrusions 51 moves in third direction D3 and in the direction away from second surface 30b as moving in the radial direction with increasing distance from rotation axis L.

Figure 10:
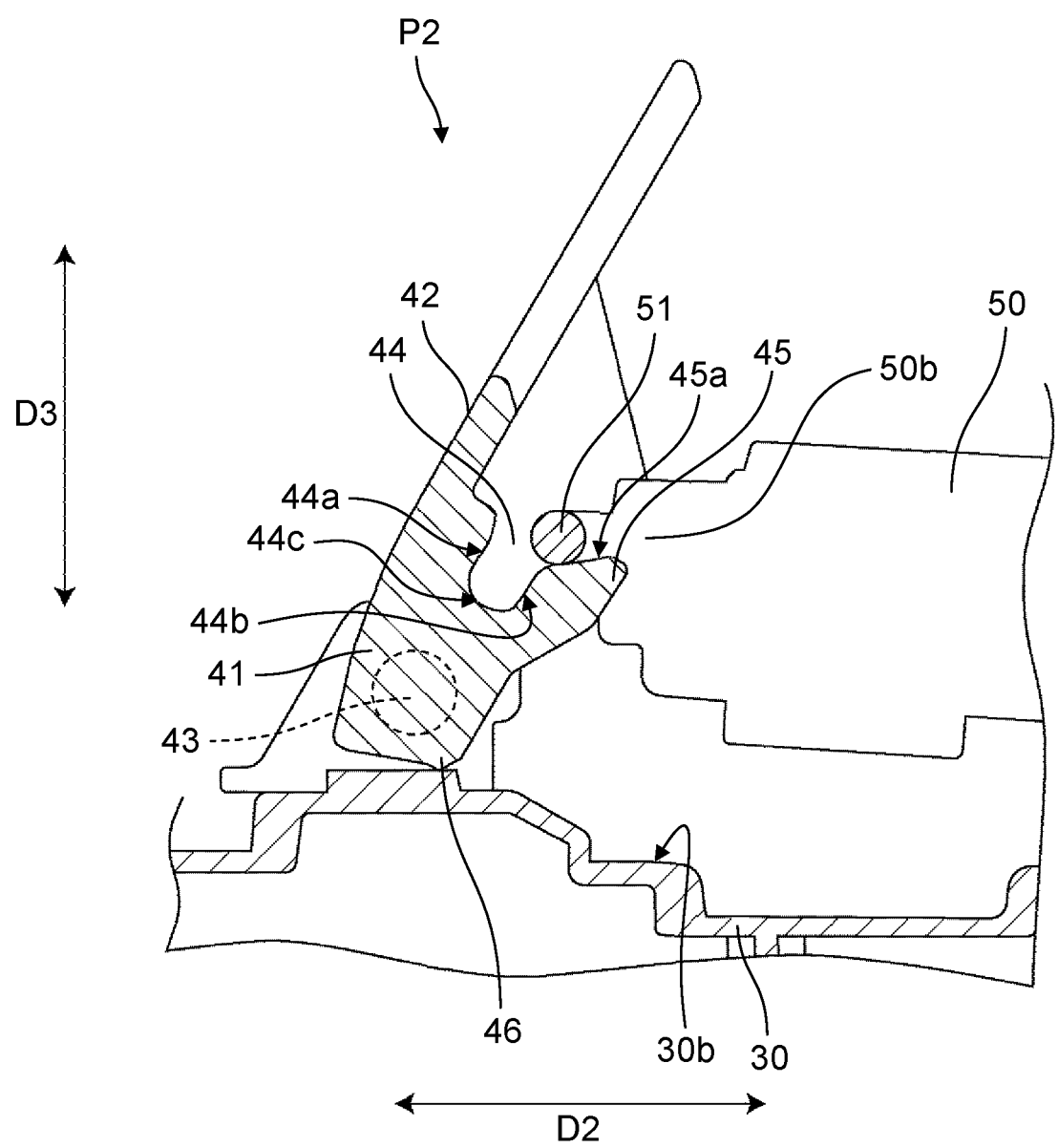
FIG. 10 is an enlarged cross-sectional view of FIG. 9.

When lever 40 is further rotated toward second position P2, each of protrusions 51 further moves in the radial direction and in the direction away from rotation axis L while being in contact with second inner surface 44b. As illustrated in FIG. 10, when lever 40 rotates to second position P2, each of protrusions 51 reaches the outside of recess 44 and is located on inclined surface 45a. In this state, each of protrusions 51 is separated from second surface 30b in third direction D3, and first end portion 50a of electronic component 50 is lifted from second surface 30b in third direction D3. Since the portion where second inner surface 44b and inclined surface 45a are connected is rounded, each of protrusions 51 can smoothly move from second inner surface 44b to inclined surface 45a.

After lever 40 is rotated to second position P2, electronic component 50 can be detached from second surface 30b by gripping and raising first end portion 50a and allowing each of protruding portions 52 to escape from housing recess 34.

When attaching electronic component 50, the opposite operation to that for detaching electronic component 50 may be performed. That is, with lever 40 positioned at second position P2, protruding portions 52 of electronic component 50 are housed in housing recess 34 of housing 30, and each of protrusions 51 is disposed on inclined surface 45a. When lever 40 is rotated from second position P2 toward first position P1 from this state, each of protrusions 51 of electronic component 50 moves toward bottom surface 44c while being in contact with second inner surface 44b of recess 44. When lever 40 rotates to first position P1, each of protrusions 51 moves away from second inner surface 44b of recess 44 and comes into contact with first inner surface 44a, and is pressed toward second surface 30b by lever 40.

With electronic device 1 according to the present exemplary embodiment, it is possible to exhibit effects below.

Electronic device 1 includes housing 30 having second surface 30b, electronic component 50 detachably attached to second surface 30b, and lever 40. Lever 40 is provided adjacent to electronic component 50, and is attached to housing 30 in a state of being rotatable about rotation axis L extending along second surface 30b. Electronic component 50 in the attached state can be detached by rotating lever 40. Lever 40 has lever bodies 41 that face electronic component 50 in first direction D1 in which rotation axis L extends and extend from rotation axis L along second direction D2 that is radial direction with respect to rotation axis L and along the second surface 30b. Each of lever bodies 41 has recess 44 that is open at an end closer to electronic component 50 than to rotation axis L in the radial direction, and extends in a direction approaching rotation axis L along the radial direction. Electronic component 50 has each of protrusions 51 that faces recess 44 in first direction D1, protrudes from a surface facing each of lever bodies 41 in first direction D1 in a direction toward each of lever bodies 41 in first direction D1, and is housed in recess 44. With such a configuration, by rotating lever 40 from first position P1 toward second position P2, each of protrusions 51 moves in recess 44 in the direction away from rotation axis L, and first end portion 50a of electronic component 50 can be raised to a greater extent from second surface 30b. As a result, it is possible to realize an electronic device 1 in which an electronic component 50 can be easily detached.

Electronic component 50 has first end portion 50a close to lever 40 in second direction D2 along second surface 30b in the radial direction and second end portion 50b far from lever 40 in second direction D2. Protrusions 51 are disposed at first end portion 50a, and protruding portions 52 protruding in second direction D2 and in a direction away from lever 40 are provided at second end portion 50b. Housing 30 has wall 33 provided with housing recess 34 depressed in the second direction and in a direction away from lever 40. Protruding portions 52 are housed in housing recess 34. With such a configuration, movement of second end portion 50b of electronic component 50 in second direction D2 and in the direction away from lever 40 and movement in third direction D3 are restricted. Therefore, electronic component 50 can be rotated about second end portion 50b by rotating lever 40 from first position P1 toward second position P2. As a result, first end portion 50a of electronic component 50 can be easily raised.

each of protrusions 51 has a curved surface facing recess 44 in the rotation direction of lever 40. With such a configuration, each of protrusions 51 can be smoothly moved along recess 44.

Recess 44 has first inner surface 44a and second inner surface 44b facing each other in the rotation direction of lever 40. First inner surface 44a is disposed farther from second surface 30b in the rotation direction than second inner surface 44b is. In a state where electronic component 50 is attached to second surface 30b, first inner surface 44a comes into contact with each of protrusions 51. While lever 40 rotates in the direction away from second surface 30b, each of protrusions 51 moves in the direction away from second surface 30b while being in contact with second inner surface 44b. With such a configuration, in a state where electronic component 50 is attached to second surface 30b, each of protrusions 51 can be pressed toward second surface 30b by first inner surface 44a, so that electronic component 50 can be more reliably attached to electronic device 1. When electronic component 50 is detached from electronic device 1, each of protrusions 51 can be guided along second inner surface 44b in the radial direction and in the direction away from rotation axis L.

Each of lever bodies 41 has inclined portion 45 that is disposed closer to second surface 30b than recess 44 is in the radial direction. Inclined portion 45 has inclined surface 45a that is continuous with second inner surface 44b and inclined in a direction intersecting second inner surface 44b and approaching second surface 30b with increasing distance from rotation axis L. With such a configuration, first end portion 50a of electronic component 50 can be raised to a greater extent from second surface 30b.

Recess 44 has third inner surface 44d connected to an end of first inner surface 44a far from electronic component 50 in first direction D1 and an end of second inner surface 44b far from electronic component 50 in first direction D1. In first direction D1, each of protrusions 51 is disposed between third inner surface 44d and electronic component 50. With such a configuration, since each of protrusions 51 can be supported by the three surfaces, the mechanical strength of lever 40 can be improved.

Each of lever bodies 41 has cam portion 46 disposed on the opposite side of recess 44 with respect to rotation axis L in the radial direction. Cam portion 46 is configured to be in contact with second surface 30b in a state where electronic component 50 is attached to second surface 30b. With such a configuration, electronic component 50 can be more reliably attached to second surface 30b.

In the present exemplary embodiment, an example in which housing recess 34 is provided in housing 30 has been described, but the present invention is not limited thereto. For example, protruding portions 52 of electronic component 50 and housing recess 34 of housing 30 may be omitted.

In the present exemplary embodiment, an example in which electronic device 1 includes one lever 40 has been described, but electronic device 1 may include a plurality of levers 40. For example, two levers 40 may be provided adjacent to both ends of electronic component 50 in second direction D2. In this case, protrusions 51 may also be provided at second end portion 50b of electronic component 50.

In the present exemplary embodiment, an example in which each of protrusions 51 has a curved surface has been described, but each of protrusions 51 does not need to have a curved surface.

In the present exemplary embodiment, an example in which each of lever bodies 41 has inclined portion 45 has been described, but each of lever bodies 41 does not need to have inclined portion 45.

In the present exemplary embodiment, an example in which each of lever bodies 41 includes cam portion 46 has been described, but each of lever bodies 41 does not need to include cam portion 46.

In the present exemplary embodiment, an example in which recess 44 has third inner surface 44d has been described, but recess 44 does not need to have third inner surface 44d.

In the present exemplary embodiment, an example in which each of protrusions 51 is substantially circular when viewed along first direction D1 has been described, but each of protrusions 51 is not limited to being substantially circular when viewed along first direction D1, and may have, for example, a polygonal shape.

In the present exemplary embodiment, an example in which connection part 42 has a substantially right triangular shape has been described, but connection part 42 may have other shapes. For example, connection part 42 may have a substantially rectangular shape.

In present exemplary embodiment, an example in which bearing hole 32 and rotation shaft portion 43 are substantially circular has been described, but the present invention is not limited thereto. Bearing hole 32 and rotation shaft portion 43 can adopt any desired shape that can rotate while rotation shaft portion 43 is housed in bearing hole 32.

In the present exemplary embodiment, an example in which first elastic terminal 35 is provided in housing 30 and first connecting terminals 53 are provided in electronic component 50 has been described, but first elastic terminal 35 may be provided in electronic component 50 and first connecting terminals 53 may be provided in housing 30. The same applies to second elastic terminal 36 and second connecting terminal 54.

First elastic terminal 35 and second elastic terminal 36 are not limited to being formed of a leaf spring, and may be formed of another elastic member.

Although the present disclosure has been fully described in connection with preferable exemplary embodiments with reference to the accompanying drawings, various modifications and changes are obvious to those skilled in the art. It is to be understood that such modifications and changes are included within the scope of the present disclosure according to the appended claims unless such modifications and changes depart from the scope of the present disclosure.

INDUSTRIAL APPLICABILITY

The present disclosure is useful for an electronic device to which an electronic component is detachably attached.

REFERENCE MARKS IN THE DRAWINGS 1 electronic device
10 first unit
11 display
20 second unit
21 keyboard
22 touch pad
23 hinge
30 housing
30a first surface
30b second surface
31 bearing
32 bearing hole
33 wall
33a wall surface
34 housing recess
35 first elastic terminal
35a first connection portion
36 second elastic terminal
36a second connection portion
40 lever
41 lever body
42 connection part
43 rotation shaft portion
44 recess
44a first inner surface
44b second inner surface
44c bottom surface
44d third inner surface
45 inclined portion
45a inclined surface
46 cam portion
50 electronic component
50a first end portion
50b second end portion
51 protrusion
52 protruding portion
53 first connecting terminal
54 second connecting terminal
D1 first direction
D2 second direction
D3 third direction
L rotation axis

The invention claimed is:
1. An electronic device comprising:
a housing including an attachment surface;
an electronic component detachably attached to the attachment surface; and
a lever that is provided adjacent to the electronic component and is attached to the housing in a state of being rotatable about a rotation axis extending along the attachment surface, the lever being configured to detach the electronic component attached to the attachment surface by being rotated,
wherein
the lever includes a lever body that faces the electronic component in a first direction along which the rotation axis extends, the lever body extending from the rotation axis along a second direction that is a radial direction orthogonal to the rotation axis and along the attachment surface,
the lever body includes:
an end closer to the electronic component than to the rotation axis in the radial direction, and
a recess that is open at the end and is recessed in a direction approaching the rotation axis along the radial direction,
the electronic component includes:
a surface facing the lever body in the first direction,
a protrusion that faces the recess in the first direction, protrudes from the surface facing the lever body, and is housed in the recess,
a first end portion close to the lever in the second direction, and a second end portion that is distant from the lever in the second direction, the protrusion is provided at the first end portion of the electronic component by rotating the lever in a direction away from the attachment surface, the lever moves the protrusion in the recess in a direction away from the rotation axis, and the first end portion of the electronic component is lifted from the attachment surface while the second end portion of the electronic component is in contact with the attachment surface.

2. The electronic device according to claim 1, wherein the electronic component further includes a protruding portion disposed at the second end portion and protruding in a direction away from the lever, the housing further includes a wall including a housing recess depressed in the direction away from the lever, and the protruding portion is housed in the housing recess.

3. The electronic device according to claim 2, wherein the protruding portion includes a connecting terminal, the housing further includes an elastic terminal provided inside the housing recess, and the connecting terminal is electrically connected to the elastic terminal in a state where the electronic component is attached to the attachment surface.

4. The electronic device according to claim 1, wherein the protrusion has a curved surface facing the recess.

5. The electronic device according to claim 1, wherein the recess has a first inner surface and a second inner surface facing each other, the first inner surface is disposed farther from the attachment surface than the second inner surface is, the first inner surface is in contact with the protrusion in a state where the electronic component is attached to the attachment surface, and while the lever rotates in the direction away from the attachment surface, the protrusion moves in the direction away from the attachment surface while being in contact with the second inner surface.

6. The electronic device according to claim 5, wherein the lever body further includes an inclined portion that is disposed closer to the attachment surface than the recess is in the radial direction, and the inclined portion has an inclined surface that is continuous with the second inner surface, the inclined surface being inclined in a direction intersecting the second inner surface and in a direction approaching the attachment surface with increasing distance from the rotation axis.

7. The electronic device according to claim 6, wherein the protrusion is located on the inclined surface after the protrusion comes into contact with the second inner surface while the lever rotates in the direction away from the attachment surface.

8. The electronic device according to claim 6, wherein the recess further includes a third inner surface connected to the first inner surface and the second inner surface, and the protrusion is disposed between the third inner surface and the electronic component in the first direction.

9. The electronic device according to claim 1, wherein the lever body further includes a cam portion disposed on an opposite side of the recess with respect to the rotation axis in the radial direction, and the cam portion is configured to come into contact with the attachment surface in a state where the electronic component is attached to the attachment surface.

10. The electronic device according to claim 9, wherein the cam portion has a trapezoidal shape.

11. The electronic device according to claim 1, wherein the lever body includes a first lever body and a second lever body, and the electronic component is located between the first lever body and the second lever body in the first direction.

* * * * *